United States Patent
Chu et al.

(10) Patent No.: US 7,679,973 B2
(45) Date of Patent: Mar. 16, 2010

(54) REGISTER FILE

(75) Inventors: Sam Gat-Shang Chu, Round Rock, TX (US); Saiful Islam, Austin, TX (US); Shelton Siuwah Leung, Austin, TX (US); Jose Angel Paredes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/180,520

(22) Filed: Jul. 26, 2008

(65) Prior Publication Data

US 2008/0279015 A1 Nov. 13, 2008

Related U.S. Application Data

(63) Continuation of application No. 10/798,902, filed on Mar. 11, 2004, now Pat. No. 7,443,737.

(51) Int. Cl.
G11C 7/10 (2006.01)
(52) U.S. Cl. .............. 365/189.05; 365/189.09; 365/198; 365/189.02; 365/189.03
(58) Field of Classification Search ........... 365/189.05, 365/189.09, 198, 189.02, 189.03
See application file for complete search history.

(56) References Cited

U.S. PATENT DOCUMENTS

| | | | |
|---|---|---|---|
| 5,150,326 A | 9/1992 | Aoki | 365/189.01 |
| 5,481,495 A * | 1/1996 | Henkels et al. | 365/189.02 |
| 5,513,363 A | 4/1996 | Kumar et al. | 712/1 |
| 5,629,901 A | 5/1997 | Ho | 365/230.05 |
| 5,892,936 A | 4/1999 | Tran et al. | 712/216 |
| 6,032,241 A | 2/2000 | Green | 365/203 |
| 6,041,387 A | 3/2000 | Fleck et al. | 711/5 |
| 6,105,123 A * | 8/2000 | Raje | 365/189.04 |
| 6,279,144 B1 | 8/2001 | Henkels et al. | 365/189.02 |
| 6,430,083 B1 | 8/2002 | Lu et al. | 365/154 |
| 6,654,937 B1 | 11/2003 | Amatangelo et al. | 716/6 |
| 6,826,109 B2 | 11/2004 | Nakahara et al. | 365/229 |
| 2002/0071305 A1 | 6/2002 | Lu et al. | 365/154 |
| 2003/0009318 A1 | 1/2003 | Amatangelo et al. | 703/19 |
| 2005/0099851 A1 | 5/2005 | Chu et al. | 365/189.02 |

\* cited by examiner

*Primary Examiner*—Thong Q Le
(74) *Attorney, Agent, or Firm*—Francis Lammes; Stephen J. Walder, Jr.; Diana R. Gerhardt

(57) ABSTRACT

A register file is often used within integrated circuitry to temporarily hold data. Sometimes this data needs to be retained within the register file for a period of time, such as when there is a stall operation. Conventional register files have utilized a hold multiplexor to perform such a stall operation. The multiplexor however inserts a delay that is undesirable in high performance integrated circuitry. The multiplexor is replaced with a tri-state inverter coupled to the global bit line of the register file, which minimizes this additional delay from the register file data access time.

12 Claims, 6 Drawing Sheets

US 7,679,973 B2

REGISTER FILE

CROSS REFERENCE TO RELATED APPLICATIONS

The present application is a continuation application of U.S. patent application Ser. No. 10/798,902, filed on Mar. 11, 2004, issued as U.S. Pat. No. 7,443,737 on Oct. 28, 2008, which is assigned to the assignee of the present invention. The present application claims priority benefits to U.S. Pat. No. 7,443,737.

TECHNICAL FIELD

The present invention relates in general to integrated circuitry, and in particular, to register files.

BACKGROUND INFORMATION

Register files are memory units that are commonly used in modern day state-of-the art processors, and other integrated circuitry. Register files are valuable for temporarily storing data for subsequent use by other processing circuitry. Often a need arises for the output to be multiplexed with another signal before it enters a latch. Such a common usage is when the latched output data needs to be retained to avoid a conflict created by any kind of stall operation. In such a scenario, a hold multiplex (MUX) is used where the latch output is fed back to the MUX with a stall signal as the select signal. The conventional approach of adding this MUX in the output data path some extra delay, which can cause the access time to increase. Such an added delay may be detrimental in high-performance processors and other integrated circuitry, which may be in the middle of a calculation of data, and need the data from the register file immediately.

Therefore, there is a need in the art for an improved register file that minimizes the extra delay caused by the multiplexor circuit.

SUMMARY OF THE INVENTION

The present invention addresses the foregoing need by providing a register file that does not utilize a multiplexor directly within the data path from the register file to the output of the array. By removing this extra multiplexor, the previously incurred delay through the MUX is merely replaced with some extra loading on the global bit line of the register file, which causes almost no additional delay in the data access time. Thus, where a data multiplexing is required, the present invention provides a register file that is faster and more efficient in terms of performance.

In an embodiment of the present invention, local bit lines are coupled together and to a tri-state inverter, whose output is the global bit line of the register array. Depending upon the number of entries in the register file, there could be a number of tri-stated inverters whose outputs are wired-ORed. In a conventional approach, this wired-ORed signal would proceed through a 2:1 MUX before the output latch. In an embodiment of the present invention, the 2:1 MUX is removed and replaced with a tri-state inverter whose output is coupled to the global bit line.

In another embodiment, the 2:1 MUX is replaced with a transmission gate multiplexer whose output is coupled to the global bit line.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
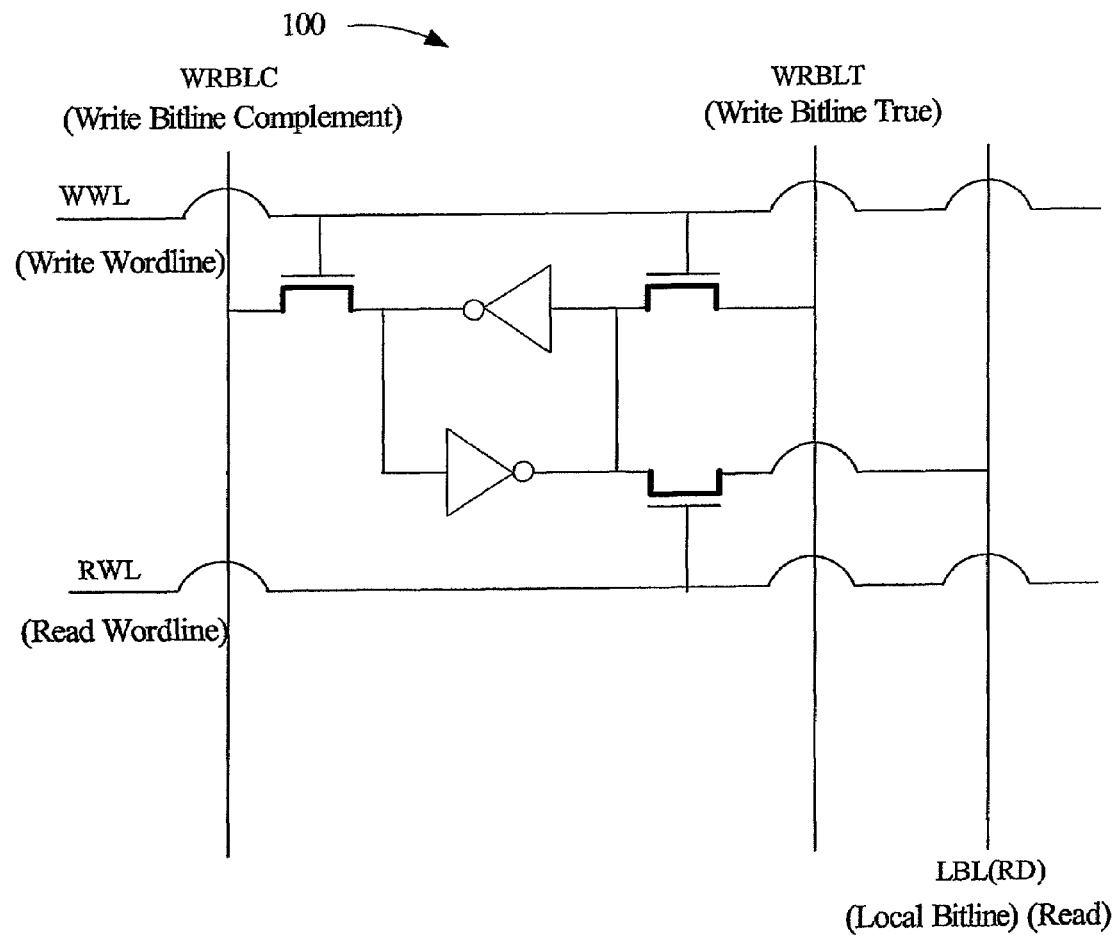
FIG. 1 illustrates a typical memory cell used within register files.

In the following description, numerous specific details are set forth such as specific configurations, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a single register file cell 100. The cell can be single ported (one read and one write) or could have multiple read and write ports. With respect to a description of the present invention hereinafter, a single read port register file cell will be utilized and referred to, but the present invention is equally applicable to using multiple read ports.

Figure 2:
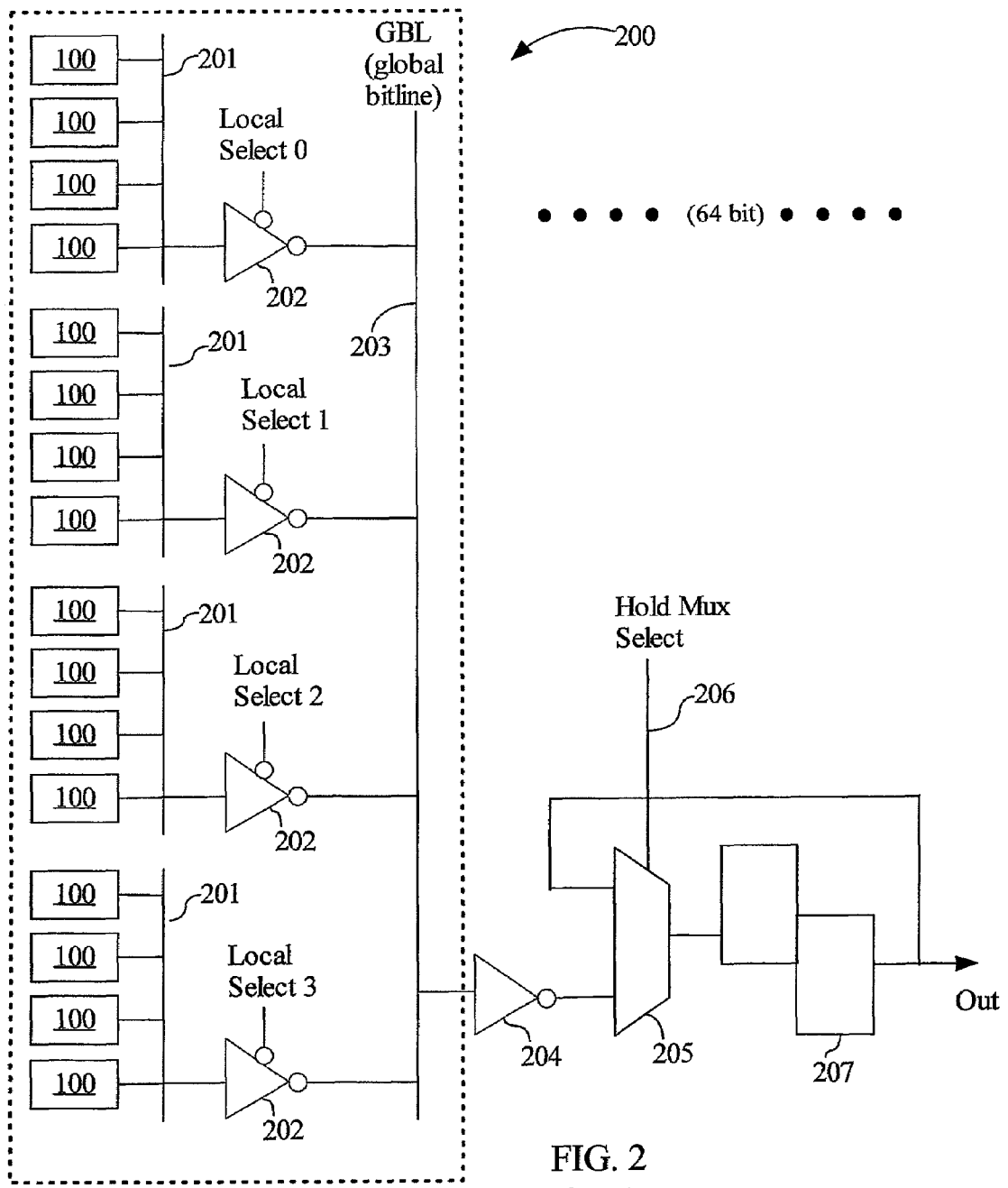
FIG. 2 illustrates a prior art register file.

FIG. 2 illustrates a prior art register file 200, which could be configured as a 16-entry by 64 register file, meaning there are sixteen unique word lines with sixty-four columns. Register file 200 makes use of the cells 100. The read bit lines of each cell 100 are coupled with a plurality of similar cells. There are then a plurality of unique local bit lines (LBLs) 201, with each local bit line 201 coupled to an input of a tri-state inverter 202 whose outputs are coupled to form a global bit line (GBL) 203. Local Select signals 0 . . . 3 are used to control the tri-state inverters 202. The global bit line 203 is coupled to an input of an inverter 204, which has its output coupled to one of the inputs of a multiplexor 205. An output of the multiplexor 205 is coupled to a latch 207, whose output may be coupled to other circuitry (not shown). The output of the latch 207 is fed back to the other input of the multiplexor 205. Control of the multiplexor 205 is from a Hold MUX Select signal 206. When it is desired to temporarily hold the data output from the register file 200 in the latch 207, circuitry (not shown) will send the Hold MUX Select signal 206 to the multiplexor 205.

Figure 3:
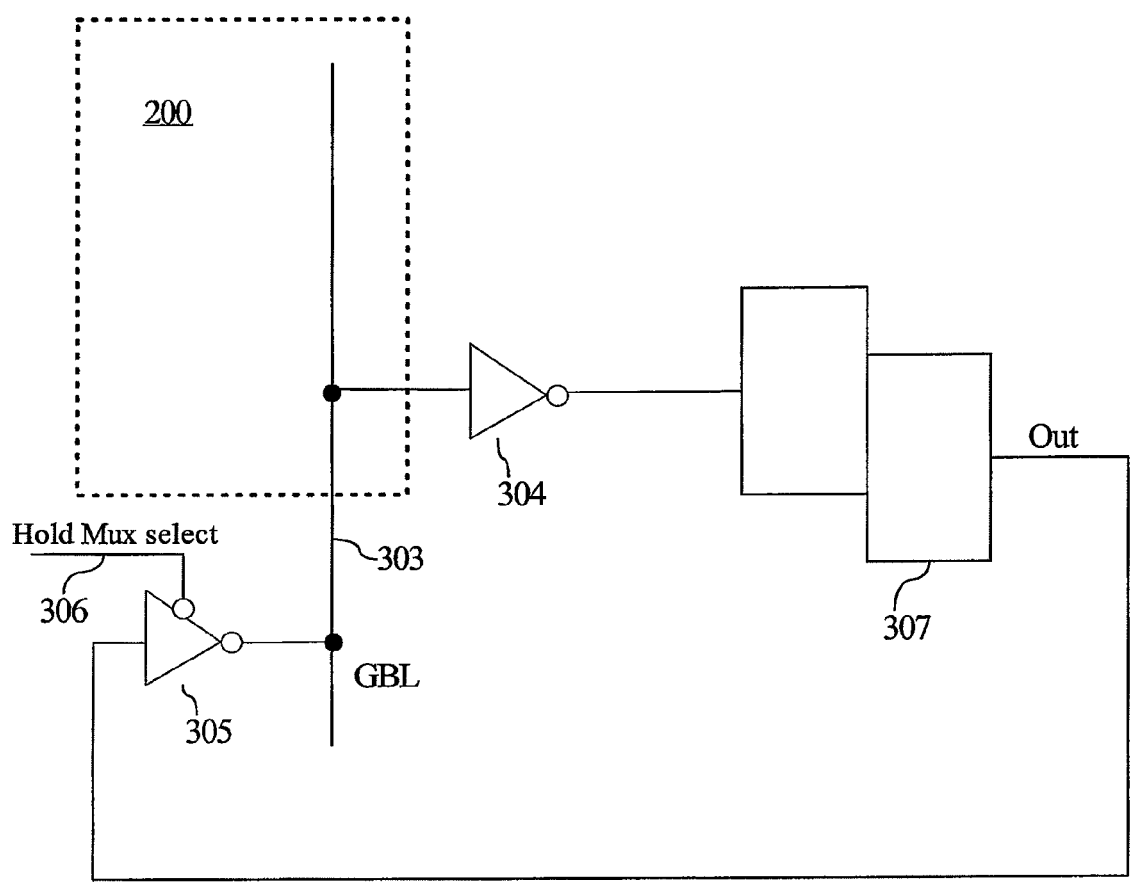
FIG. 3 illustrates a register file in accordance with an embodiment of the present invention.

FIG. 3 illustrates an embodiment of the present invention where the multiplexor 205 is essentially replaced with a tri-state inverter 305. The register file cells and their local bit line circuitry 200 can be as similarly described above with respect to FIG. 2. Note, however, that the description of the present invention following could use any other size register file. The global bit line 303 is coupled to an input of an inverter 304 whose output is coupled to an input of latch 307. The output of latch 307 is the output of the register file of this embodiment of the present invention, and is also fed back to an input of the tri-state inverter 305, whose output is coupled to the global bit line 303. The Hold MUX Select signal 306, which can be similarly generated as above as with Hold MUX Select signal 206 is coupled to inverter 305. In this case, the Hold MUX Select signal 306 may be an active low signal. Logically, the register file of FIG. 3 performs the same operation as that of FIG. 2, but does not have the delay associated with the multiplexor 205.

The tri-state inverters 202 for each local bit line group will have a separate local select signal, which are generated from read addresses. This is to ensure that when a local bit line group (e.g., in this example, a group of four) is not selected, then the tri-state inverter selected puts its output into a high-impedance state. Therefore, the only local bit line group which is selected forwards the local bit line value onto the global bit line 303. In case of a stall operation or any other bit line multiplexing, the Hold MUX Select signal 306 will be used as the tri-state inverter select and also as part of the decoding which generates local bit line select signals. This will ensure that when a stall is needed, then all local bit line groups will generate high-impedance states on the global bit line 303, such that only the hold tri-state inverter 305 dictates the value on the global bit line 303.

Figure 5:
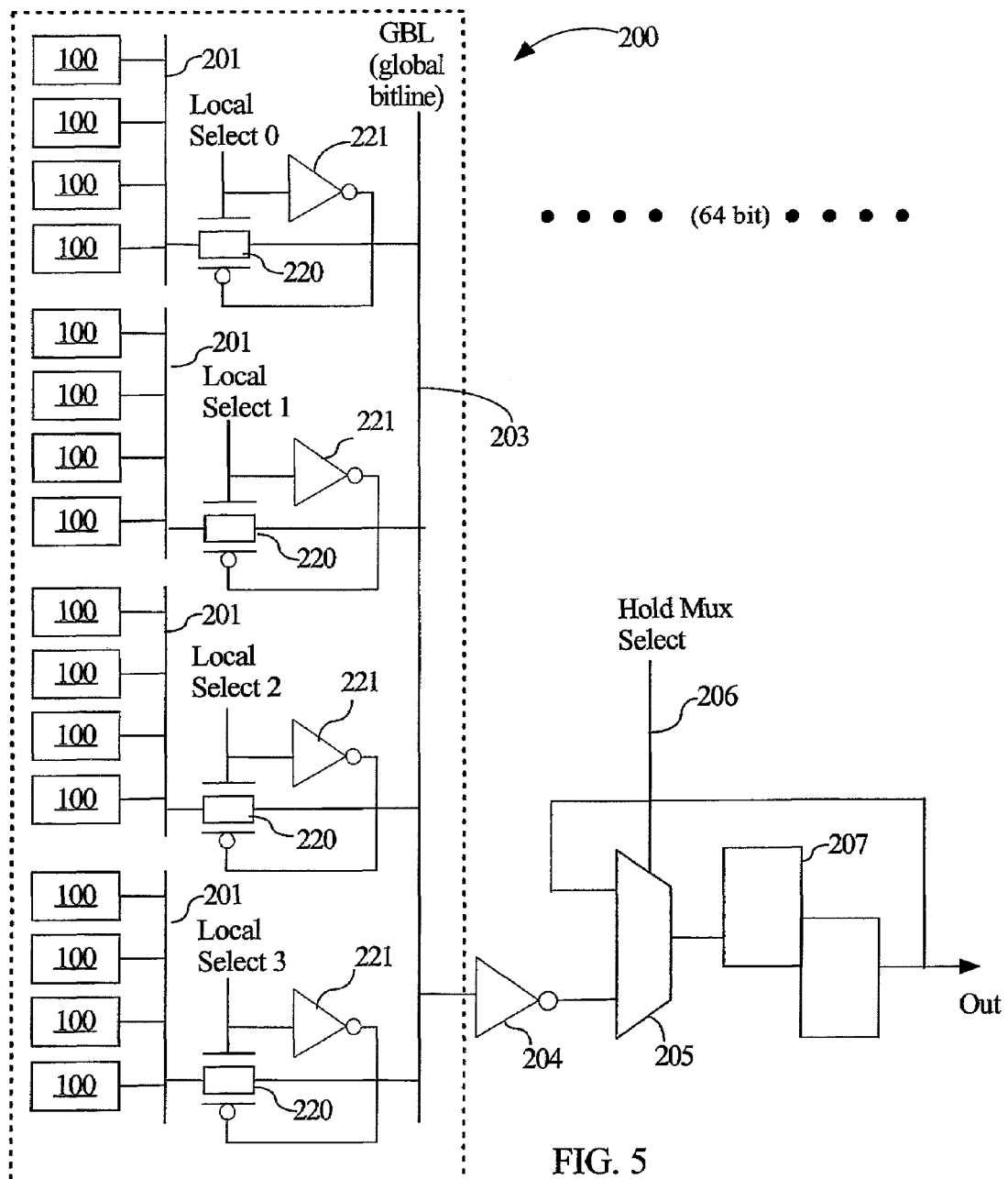
FIG. 5 illustrates a prior art register file.
Figure 6:
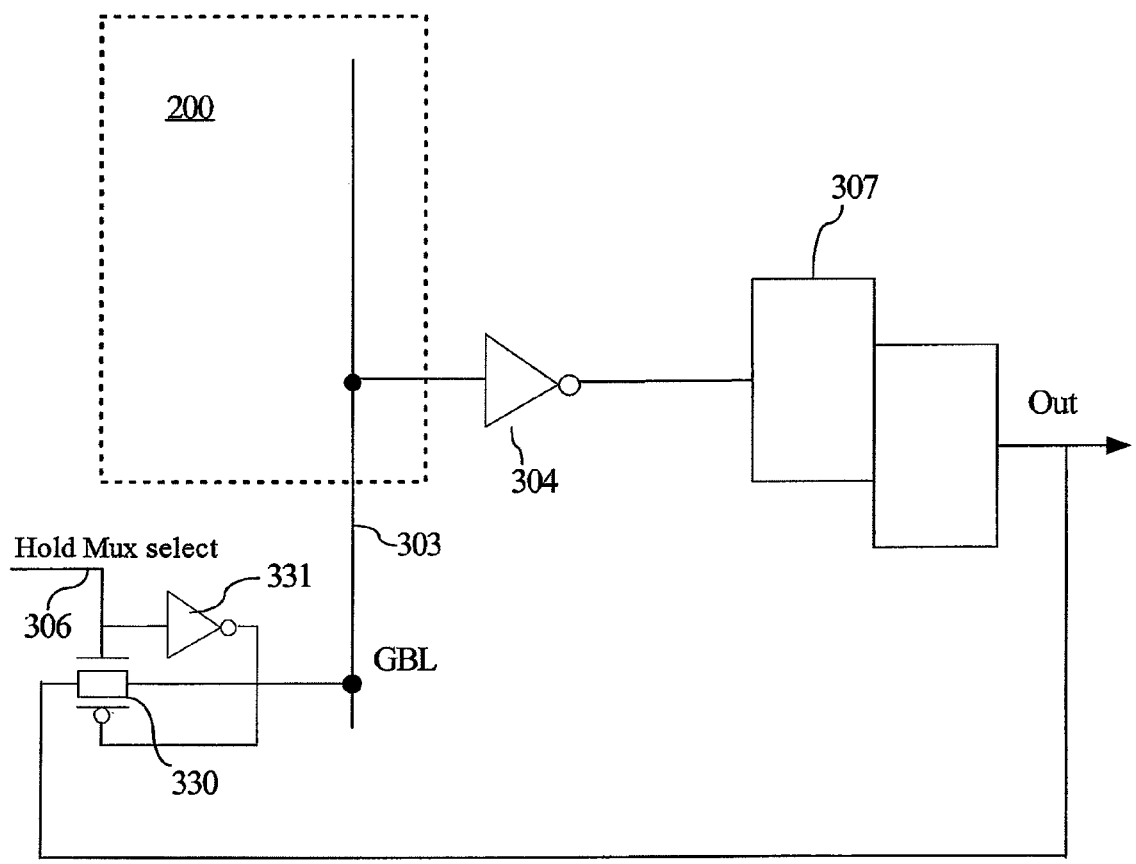
FIG. 6 illustrates a register file in accordance with another embodiment of the present invention.

FIG. 5 illustrates another prior art register file, similar to the register file illustrated in FIG. 2 except that the tri-state inverter 202 is replaced with a transmission gate multiplexor circuit comprising transmission gate 220 and inverter 221. As shown in FIG. 6, the multiplexor 205 is replaced in this embodiment by a transmission gate multiplexor circuit comprising transmission gate 330 and inverter 331. The advantages described above with respect to FIG. 3 are also enjoyed by the register file shown in FIG. 6.

Figure 4:
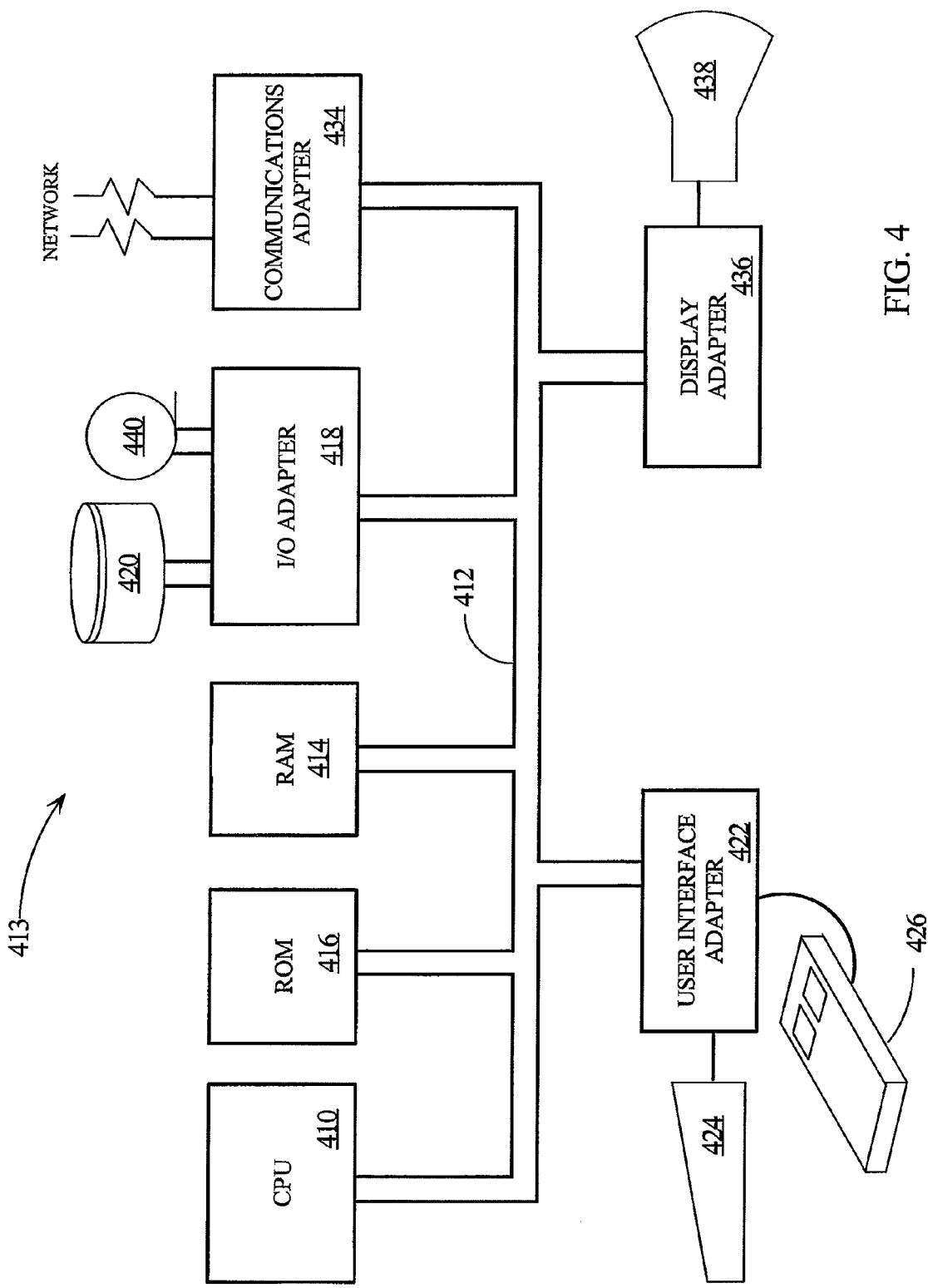
FIG. 4 illustrates a data processing system configured in accordance with the present invention.

A representative hardware environment for practicing the present invention is depicted in FIG. 4, which illustrates an exemplary hardware configuration of data processing system 413 in accordance with the subject invention having central processing unit (CPU) 410, such as a conventional microprocessor, and a number of other units interconnected via system bus 412. Data processing system 413 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, and/or other user interface devices such as a touch screen device (not shown) to bus 412, communication adapter 434 for connecting data processing system 413 to a data processing network, and display adapter 436 for connecting bus 412 to display device 438. CPU 410 may include other circuitry not shown herein, which will include circuitry commonly found within a microprocessor, e.g., execution unit, bus interface unit, arithmetic logic unit, etc. CPU 410 may also reside on a single integrated circuit. The register array described with respect to FIGS. 3 and 6 may be used in various portions of system 413.

Although the present invention and its advantages have been described in detail, it should be understood that various changes, substitutions and alterations can be made herein without departing from the spirit and scope of the invention as defined by the appended claims.

What is claimed is:

1. A register file comprising:
   a register array comprising a plurality of register file cells coupled to a bit line;
   a latch coupled to the bit line; and
   an inverter coupled between an output of the latch and the bit line, wherein the output of the latch is an output of the register array.

2. The register file as recited in claim 1, further comprising:
   another inverter coupled between the bit line and an input of the latch.

3. The register file as recited in claim 1, wherein the inverter is a tri-state inverter receiving a hold select signal to control operation of the inverter.

4. The register file as recited in claim 3, wherein an output of the inverter is coupled to the bit line and wherein an input of the inverter is coupled to the output of the latch.

5. The register file as recited in claim 4, wherein data is read out of the register array to be input into the latch.

6. The register file as recited in claim 1, wherein a multiplexor is not coupled between the bit line and the latch.

7. A register file comprising:
   a register array comprising a plurality of register file cells coupled to a bit line;
   a latch coupled to the bit line; and
   a transmission gate circuit coupled between an output of the latch and the bit line, wherein the output of the latch is an output of the register file.

8. The register file as recited in claim 7, further comprising:
   an inverter coupled between the bit line and an input of the latch.

9. The register file as recited in claim 7, wherein the transmission gate circuit receives a hold select signal.

10. The register file as recited in claim 9, wherein an output of the transmission gate circuit is coupled to the bit line and wherein an input of the transmission gate circuit is coupled to the output of the latch.

11. The register file as recited in claim 10, wherein data is read out of the register array to be input into the latch.

12. The register file as recited in claim 7, wherein a multiplexor is not coupled between the bit line and the latch.

* * * * *